US006889032B2

(12) United States Patent
Dao et al.

(10) Patent No.: US 6,889,032 B2
(45) Date of Patent: *May 3, 2005

(54) MOBILE BASE STATION FOR DISSEMINATING INFORMATION

(75) Inventors: Son K. Dao, Northridge, CA (US); Yongguang Zhang, Calabasas, CA (US); Eddie C. Shek, Los Angeles, CA (US); Asha Vellaikal, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 09/849,399

(22) Filed: May 3, 2001

(65) Prior Publication Data

US 2001/0018341 A1 Aug. 30, 2001

Related U.S. Application Data

(60) Continuation of application No. 09/238,333, filed on Jan. 27, 1999, which is a division of application No. 08/589,274, filed on Jan. 22, 1996, now Pat. No. 5,915,207.

(51) Int. Cl.[7] .......................... H04B 7/15; H04B 10/00; H04Q 7/20; H04L 12/28; H04L 12/56

(52) U.S. Cl. ...................... 455/11.1; 455/427; 455/428; 455/431; 455/465; 379/56.1; 370/397

(58) Field of Search .......................... 455/39, 11.1, 465, 455/428, 427, 431; 370/397; 379/56.1

(56) References Cited

U.S. PATENT DOCUMENTS

| | | | | |
|---|---|---|---|---|
| 3,745,462 A | * | 7/1973 | Trimble | 455/11.1 |
| 4,056,780 A | | 11/1977 | Faulkner | 325/5 |
| 4,284,848 A | | 8/1981 | Frost | 179/2 EB |

(Continued)

FOREIGN PATENT DOCUMENTS

| | | |
|---|---|---|
| EP | 0 537 756 A | 4/1993 |
| WO | WO 93 09631 A | 5/1993 |
| WO | WO 94/28684 | 12/1994 |
| WO | WO 95/04407 | 2/1995 |
| WO | WO 95 32585 A | 11/1995 |
| WO | WO 97 07609 A | 2/1997 |
| WO | WO 99/23769 | 5/1999 |
| WO | WO 00/14902 A2 | 3/2000 |

OTHER PUBLICATIONS

N. Murghafori et al., "A design for file access in a mobile environment", "Workshop on Mobile Computing Systems and Applications" (Dec. 8, 1994) IEEE Computer Society Technical Committee on Operating Systems and Application Environments (TCOS), pp 57–62.

*Primary Examiner*—William Cumming
(74) *Attorney, Agent, or Firm*—Georgann S. Grunebach; John A. Crook, III

(57) ABSTRACT

A device for implementing a multimedia communication dissemination system is disclosed herein. The communication system integrates heterogeneous satellite transmission systems, local area computer networks, and the public telephone system to implement a flexible, high-speed communication system. The preferred communication dissemination system includes a broadcast server for broadcasting an information signal, a mobile base station for receiving the information signal broadcast from the broadcast server, and a local area network for distributing information received by the mobile base station. The preferred mobile base station includes a receiver for receiving information signals transmitted from a broadcast server, a network interface for distributing processed information signals, and a software proxy process for processing information signals. A software proxy process controls the dissemination of information through the network. The software proxy process provides filter and protocol functions to facilitate interconnection between heterogenous communication systems.

31 Claims, 3 Drawing Sheets

U.S. PATENT DOCUMENTS

| | | | | | |
|---|---|---|---|---|---|
| 4,748,655 | A | | 5/1988 | Thrower et al. | 379/60 |
| 5,265,150 | A | | 11/1993 | Helmkamp et al. | 379/58 |
| 5,276,703 | A | | 1/1994 | Budin et al. | 375/1 |
| 5,282,239 | A | * | 1/1994 | Yokoi et al. | 455/465 |
| 5,303,286 | A | * | 4/1994 | Wiedeman | 455/428 |
| 5,339,330 | A | | 8/1994 | Mallinckrodt | |
| 5,381,459 | A | | 1/1995 | Lappington | 379/56 |
| 5,404,505 | A | | 4/1995 | Levinson | |
| 5,408,515 | A | | 4/1995 | Bhagat et al. | 379/59 |
| 5,448,621 | A | * | 9/1995 | Knudsen | 455/427 |
| 5,463,671 | A | * | 10/1995 | Marsh et al. | 379/56.1 |
| 5,519,761 | A | * | 5/1996 | Gilhousen | 455/431 |
| 5,564,072 | A | | 10/1996 | Garcia Aguilera et al. | 455/56.1 |
| 5,586,121 | A | | 12/1996 | Moura et al. | |
| 5,603,080 | A | | 2/1997 | Kallander et al. | 455/14 |
| 5,617,410 | A | | 4/1997 | Matsumoto | |
| 5,623,495 | A | * | 4/1997 | Eng et al. | 370/397 |
| 5,625,864 | A | | 4/1997 | Budow et al. | |
| 5,655,005 | A | | 8/1997 | Wiedeman et al. | 370/320 |
| 5,657,317 | A | | 8/1997 | Mahany et al. | 370/338 |
| 5,659,350 | A | | 8/1997 | Hendricks et al. | |
| 5,682,195 | A | | 10/1997 | Hendricks et al. | |
| 5,684,799 | A | | 11/1997 | Bigham et al. | |
| 5,684,801 | A | | 11/1997 | Amitay et al. | 370/447 |
| 5,689,547 | A | | 11/1997 | Molne | 379/58 |
| 5,708,961 | A | | 1/1998 | Hylton et al. | |
| 5,715,516 | A | | 2/1998 | Howard et al. | |
| 5,717,737 | A | | 2/1998 | Doviak et al. | |
| 5,726,984 | A | | 3/1998 | Kubler et al. | 370/349 |
| 5,727,065 | A | | 3/1998 | Dillon | |
| 5,729,279 | A | | 3/1998 | Fuller | |
| 5,790,070 | A | | 8/1998 | Natarajan et al. | |
| 5,828,659 | A | | 10/1998 | Teder et al. | |
| 5,852,721 | A | | 12/1998 | Dillon et al. | |
| 5,884,140 | A | | 3/1999 | Ishizaki et al. | 455/2 |
| 5,890,067 | A | | 3/1999 | Chang et al. | |
| 5,915,207 | A | | 6/1999 | Dao et al. | 455/9 |
| 5,949,766 | A | | 9/1999 | Ibanez-Meier et al. | |
| 5,963,862 | A | | 10/1999 | Adiwoso et al. | |
| 5,963,943 | A | | 10/1999 | Cummins et al. | 707/10 |
| 5,974,317 | A | | 10/1999 | Djuknic et al. | |
| 5,990,928 | A | | 11/1999 | Sklar et al. | |
| 5,995,725 | A | | 11/1999 | Dillon | |
| 5,995,726 | A | | 11/1999 | Dillon | |
| 6,005,561 | A | | 12/1999 | Hawkins et al. | 345/327 |
| 6,016,388 | A | | 1/2000 | Dillon | |
| H1837 | H | | 2/2000 | Fletcher et al. | 455/433 |
| 6,061,562 | A | | 5/2000 | Martin et al. | |
| 6,105,060 | A | | 8/2000 | Rothblatt | |
| 6,118,824 | A | | 9/2000 | Smith et al. | |
| 6,119,016 | A | | 9/2000 | Matusevich | |
| 6,151,308 | A | | 11/2000 | Ibanez-Meier et al. | |
| 6,160,994 | A | | 12/2000 | Wiedeman | |
| 6,161,141 | A | | 12/2000 | Dillon | |
| 6,198,920 | B1 | | 3/2001 | Doviak et al. | |
| 6,201,797 | B1 | | 3/2001 | Leuca et al. | |
| 6,208,307 | B1 | | 3/2001 | Frisco et al. | |
| 6,269,244 | B1 | | 7/2001 | Alperovich et al. | |
| 6,301,463 | B1 | * | 10/2001 | Dao et al. | 455/39 |
| 6,308,045 | B1 | | 10/2001 | Wright et al. | |
| 6,324,398 | B1 | | 11/2001 | Lanzerotti et al. | |
| 6,324,405 | B1 | | 11/2001 | Young et al. | |
| 6,337,911 | B1 | | 1/2002 | Dillon | |
| 6,338,131 | B1 | | 1/2002 | Dillon | |
| 6,343,205 | B1 | | 1/2002 | Threadgill et al. | |
| 6,356,539 | B1 | | 3/2002 | Zuilani et al. | |
| 6,377,802 | B1 | | 4/2002 | McKenna et al. | |
| 6,385,647 | B1 | | 5/2002 | Willis et al. | |
| 6,408,180 | B1 | | 6/2002 | McKenna et al. | |
| 6,430,233 | B1 | | 8/2002 | Dillon et al. | |
| 6,445,777 | B1 | | 9/2002 | Clark | |
| 6,466,554 | B2 | | 10/2002 | Okada | |
| 6,507,739 | B1 | | 1/2003 | Gross et al. | |

* cited by examiner

MOBILE BASE STATION FOR DISSEMINATING INFORMATION

CROSS-REFERENCE TO RELATED APPLICATIONS

This is a continuation of application Ser. No. 09/238,333 filed Jan. 27, 1999 which was a divisional of Ser. No. 08/589,274 filed Jan. 22, 1996, now issued as U.S. Pat. No. 5,915,207, issued Jun. 22, 1999. The entire disclosure of Ser. No. 09/238,333 is incorporated herein by this reference.

FIELD OF THE INVENTION

The present invention relates in general to information communication systems, and more particularly, to a wireless communication system architecture and protocols.

BACKGROUND OF THE INVENTION

The advent of powerful, low-cost minicomputers enabled the evolution from centralized mainframe computer architectures to distributed computer architectures connected over high-speed data networks. Distributed computer architectures now range from local networks of computers within a single office, to wide-area networks covering miles, to satellite transmission systems covering entire global regions.

In contrast to distributed computer architectures, information databases have primarily remained in a centralized architecture. Database information is therefore typically disseminated to the distributed computers over communication data links. Thus, modern distributed computer systems often require the installation of high-speed data links to transmit information between processing sites. To meet these transmission requirements, high-speed data networks have been developed to link centralized information databases with distributed computer processing sites. Installation of high-speed data links, however, often requires costly and time consuming setup of high-capacity communication lines. Moreover, deployment of high-speed data links in remote field locations not served by the existing communication infrastructure is extremely difficult.

Today's communication infrastructure also includes various communication systems intended to serve other communication needs. For example, broadcast and cable television systems enable television programming to reach millions of viewers. In comparison, the public telephone network allows one subscriber to connect with another subscriber. Cellular telephone networks have extended traditional telephone service beyond the home and office to mobile subscribers. In addition, orbiting earth satellites can communicate with virtually unlimited numbers of users over large geographical areas, including areas not reached by traditional terrestrial communication systems. Service providers have also made extensive local and wide-area computer network systems accessible to the public. Such computer networks now allow users access to on-line news, sports, video and audio programming, information databases, and other computer resources such as the Internet.

These communication system are primarily designed to operate as an independent system with a transmission bandwidth capacity appropriate to serve the intended application. For example, telephone systems are primarily designed to handle low-bandwidth voice and data traffic. Accordingly, telephone systems typically support relatively low-bandwidth transmission at 9.6 kilo-bits per second (kbps). In comparison, computer networks designed to process real-time data or handle large amounts of digital data, such as an information database or graphical images, usually operate at a higher transmission bandwidth. A typical Ethernet computer network, for example, transmits at 10 megabits-per-second (mbps) for enhanced networks. Satellite communication systems designed to transmit full-motion digital video images may require even higher bandwidth equipment capable of transmitting 10 mbps or more.

In addition, communication systems may employ different methodologies to distribute information. Telephone networks primarily form point-to-point connections to connect a single subscriber to another subscriber. Computer networks typically allow a number of network nodes to access a number of other network nodes. In comparison, broadcast systems, such as a television or satellite broadcast system, typically allow one communication source to communicate with a large number of receivers.

The differences between communication systems in bandwidth rates and distribution methodology limits the interconnection and integration of heterogenous communication systems. For example, communication systems of different bandwidth rates typically cannot be connected without compensating for their different transmission rates. A 2 Mbps communication network, for example, cannot directly handle the volume of data transmitted from a faster 10 mbps system. In addition, consideration should also be given to the different manner in which systems disseminate information. Communications transported via broadcast systems are typically modified to integrate with point-to-point communication systems. Compatibility issues thus arise when interconnecting systems with different bandwidth rates and different distribution schemes. Connectivity between different communication systems may therefore be limited.

Furthermore, communication systems suffer from inherent transmission propagation delays associated with transmitting information over long distances and processing delays in distributing updated information across the system. For example, transmitting a data signal up to a geosynchronous satellite orbiting 35786 kilometers above the earth's equator and back down to a receiving earth station incurs about a quarter second transmission propagation delay. Transmitting a return signal from the receiving earth station incurs another quarter second delay. In addition to transmission propagation delays, distributed information systems may also incur processing delays in distributing updated information to users. A typical distributed information system requires users to specifically request or poll the information source to receive updated information. Waiting for a specific polling request, however, delays the distribution of updated information. While transmission propagation delays are inherent to the transmission of signals and cannot be eliminated, a communication system architecture and protocols can be implemented to minimize the effects of processing delays in distributing updated information to users.

SUMMARY OF THE INVENTION

The present invention relates to an architecture and protocols for a flexible multimedia communication dissemination system which combines satellite transmission systems, terrestrial wireless networks, and the public telephone system. Providing for the interconnection and integration between these various communication systems allows a high-speed communication system to be quickly deployed.

In one aspect of the invention, the communication system includes a broadcast server for broadcasting an information signal, and a mobile base station for receiving the information signal broadcast from the broadcast server. A local area network distributes information received by the mobile base station. In the preferred embodiment, the broadcast server includes a satellite uplink facility capable of accessing an information database and transmitting an information signal over a space segment. The mobile base station receives the transmitted information signal and operates the local area network. The local area network is preferably a wireless communication network which disseminates information to a number of mobile users.

In another aspect of the invention, a mobile base station includes a receiver for receiving information signals transmitted from a broadcast server, a network interface for distributing processed information signals, and a software proxy process for processing information signals transmitted from the broadcast server. In the preferred embodiment, the mobile base station receives an information signal transmitted via the space segment. The network interface preferably implements a mobile wireless network to allow flexibility in deploying the local area network. The mobile network also enables users to use the system in different locations. The software proxy process provides the interface between the mobile base station and the local area network.

In yet another aspect of the invention, the mobile base station includes a software proxy process to control the dissemination of information through the network. The software proxy process provides filter and protocol functions to facilitate interconnection between different communication systems. A bandwidth-based filtering process matches the bandwidth of the space segment to the bandwidth of the local area network. A user-based filtering process minimizes the bandwidth impact upon the space segment bandwidth when a number of mobile users are accessing similar database information. An active broadcast protocol minimizes latency delays associated with updating information across a distributed network.

The present invention allows several heterogenous communication systems to be integrated to form a high-speed communication system capable of transmitting multimedia data. Differences in bandwidth capacity and distribution methodology may be resolved by the software proxy of the mobile base station. The software proxy process integrates heterogenous communication systems and reduces the overall network load by reducing unnecessary transmissions. The integration of heterogeneous communication systems enables high-capacity data networks to be quickly deployed. Remote installations may be reached by a satellite covering a large geographical area. Wireless and mobile technology allows the system to be rapidly deployed with minimal equipment installation requirements.

It is to be understood that both the foregoing general description and the following detailed description are exemplary and explanatory and are intended to provide further explanation of the invention as claimed. The invention, together with the further objects and intended advantages, will best be understood by reference to the following detailed description, taken in conjunction with the accompanying drawings.

DETAILED DESCRIPTION OF THE DRAWINGS

Figure 1:
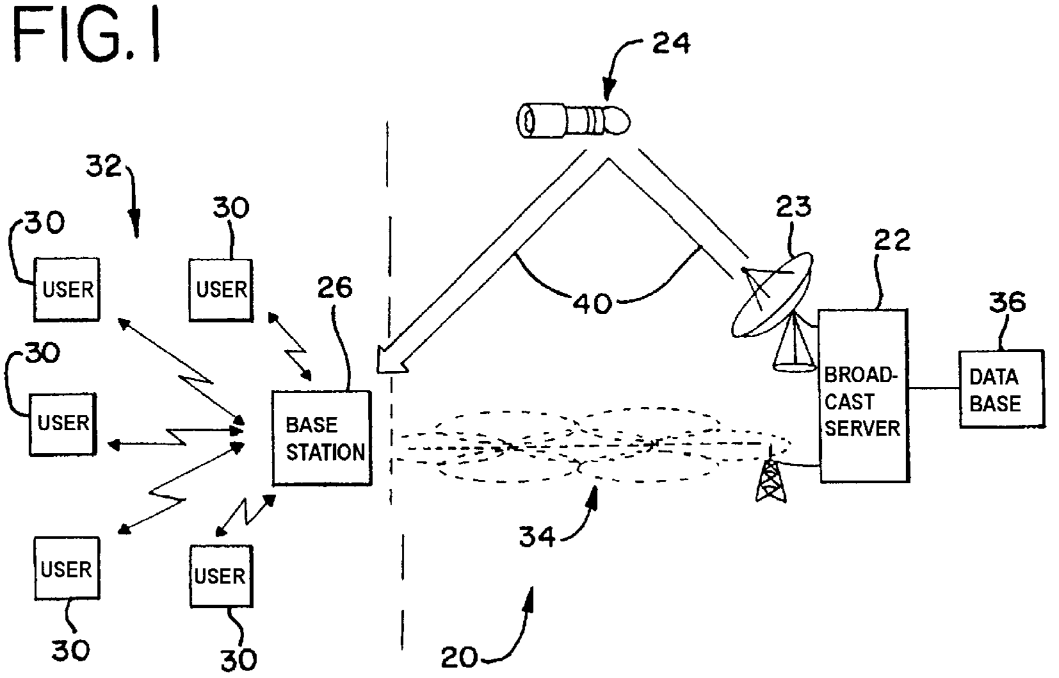
FIG. 1 is a diagram showing a communication system of the present invention.

Referring now to the drawings. FIG. I illustrates a communication system 20. The system 20 preferably includes a broadcast server 22, a space segment 24. and a mobile base station 26. The mobile base station 26 disseminates information to the mobile users 30 through a local area network 32. The broadcast server 22 uplinks an information signal 40 via space segment 24 to transmit information to the mobile base station 26.

The communication system 20 enables mobile users 30 to access and transmit information from a source or database 36 through the mobile base station 26. The broadcast server 22 accesses the information source or database 36 containing different types of information required by the mobile users 30. The broadcast server 22 preferably transmits the information database 36 via the space segment 24. Broadcast server preferably compresses, error-codes, multiplexes, and amplifies an information signal 40 for transmission via the space segment 24 using conventional digital satellite transmission techniques. Broadcast server 22 preferably includes a high-power amplifier and large aperture 23 antenna for uplinking signals to space segment 24. Hughes Network System's commercially available DirecPC service, for example, provides a broadcast server 22 and space segment 24. The DirecPC Operations Center accesses information database 36 for delivery over the space segment 24.

The space segment 24 may be implemented using a satellite transponder with a footprint covering the geographical region where the mobile base station 26 is located. Preferably, a digital satellite transponder capable of transmitting a high-power direct broadcast satellite (DBS) signal is utilized to provide space segment 24. For example, DirecPC uses a Ku-band satellite transponder to transmit the information database 36 via an information signal 40 to the mobile base station 26.

Figure 2:
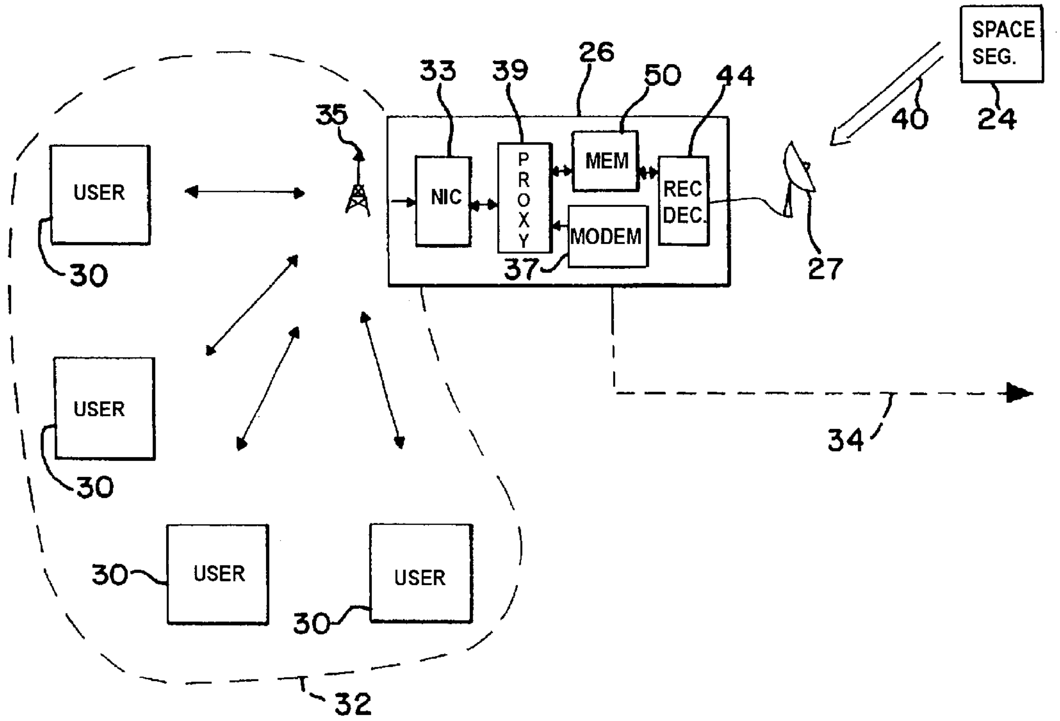
FIG. 2 shows a block diagram of the mobile base station and local area network of FIG. 1.

Referring to FIG. 2, the mobile base station 26 preferably receives the information signal 40 on a small satellite receive antenna 27. The DirecPC satellite receive antenna uses a 24-inch parabolic offset reflector to receive the information signal 40 from space segment 24. The receive antenna includes a feed horn (not shown) to receive Ku-band, linearly polarized signals. The feed horn preferably converts the received Ku-band satellite signals in the 11.7 to 12.2 GHz frequency range to a L-band signal in the 950 to 2000 MHz range. The L-band signal is transmitted along a coaxial cable to the satellite receiver/decoder electronics. It should be understood that the frequency of the information signal 40 transmitted via space segment 24 will vary to match the particular satellite frequency assignment.

The satellite receiver/decoder 44 decompresses, decodes, and demultiplexes the received information signal 40 using conventional digital techniques for satellite communications. The satellite receiver/decoder 44 is preferably implemented with software and logic including a logic processor with associated read-only-memory (ROM) and random-access-memory (RAM). The DirecPC space segment transmitting at 12 Mbps typically requires a dedicated processor or other dedicated receive hardware. One skilled in the art will recognize that other equivalent forms of logic such as a field programmable gate array (FPGA) or application specific integrated circuit (ASIC) may be used to implement the logic of satellite receiver/decoder 44.

DirecPC provides the satellite receiver/decoder 44 electronics on a 16-bit ISA adapter card to allow installation in a standard IBM compatible personal computer (PC). Accordingly, the mobile base station 26 may be implemented with a IBM compatible PC running MS Windows 3.11. A DirecPC software driver controls the operation of the satellite receiver/decoder 44 and the decoding of the information signal 40. The DirecPC software driver provides the received database information transmitted from the broadcast server 22 via the space segment 24 to the mobile base station 26.

The mobile base station 26 preferably stores database information transmitted from broadcast server 22. Mobile base station 26 thus includes memory 50 for storing database information. The mobile base station 26 stores database information according to the multiplexing and dissemination protocol of the broadcast server 22 which is described below in more detail.

Referring again to FIG. 2, the mobile base station 26 includes a local area network 32 to disseminate database information to mobile users 30. The local area network 32 connects the mobile users 30 to mobile base station 26. The mobile base station 26 operates as the network server with the mobile users 30 as network clients. The local area network 32 is a wireless mobile network to allow mobile users 30 to establish operation in various locations. A wireless network allows mobile users 30 to quickly connect to the network without requiring hard-wired connections and enables networking where hard-wired installations are not feasible. A mobile network allows mobile users 30 to remain in communication with the mobile base station 26 while allowing them to roam freely within the range of the wireless network.

For example, a wireless local area network (LAN) can be implemented with IBM compatible PCs and AT&T's commercially available WaveLAN product. AT&T WaveLAN includes a network interface card (NIC) 33 with network software to control mobile network operation, and an antenna 35 for transmitting and receiving signals. The WaveLAN NIC 33 is available in both PC AT bus format and Personal Computer Memory Card International Association (PCMCIA) Type II format for portable laptop computers. The WaveLAN antenna 35 is equipped with an 18-inch cable to allow the antenna to rest on a desktop or other worksurface. WaveLAN uses 900 MHz spread spectrum technology to implement an Ethernet type CSMA/CA (collision sense multiple access/collision avoidance) wireless network scheme with a 2 Mbps data rate. Transmitting at an output power of 250 mW, the wireless network provides a range of 600 to 800 feet in open space. It should be understood that those skilled in the art may use a time-division or frequency-division multiplexed scheme operating at different frequencies to implement the wireless network scheme. Of course, network protocols other than Ethernet or data rates other than 2 Mbps may be utilized.

Mobile users 30 preferably include IBM compatible PCs equipped with the WaveLAN NIC, antenna, and software. In the most preferred embodiment, mobile users 30 include a portable laptop PC equipped with PCMCIA WaveLAN NICs. Mobile users 30 are configured according to the desired application. The mobile users 30 are thus able to communicate with the mobile base station 26 through the WaveLAN network 32. The combination of a portable computer with the wireless network maximizes the transportability and flexibility of the system.

Referring again to FIG. 1, communication uplink 34 enables the mobile base station 26 to communicate with the broadcast server 22. The communication uplink 34 allows the mobile base station 26 to communicate information such as service requests from mobile users 30 to the broadcast server 22. For example, a mobile user 30 may wish to access the information database 36. The mobile user 30 sends the access service request via the communication uplink 34. The communication uplink 34 is preferably provided via a cellular telephone connection to the broadcast server. A conventional cellular modem 37 is used to establish the connection to the broadcast server 22. The communication uplink may also be provided by a conventional modem and a land-line telephone connection. Using a wireless cellular telephone connection, however, maximizes the transportability and flexibility of the mobile users.

The communication base system 20 distributes the information database 36 to a number of mobile users 30. Service requests from the mobile users are sent over the local area network 32 to the mobile base station 26. The mobile base station 26 relays the service request over the communication uplink 34 to broadcast server 22. The broadcast server 22 accesses the information database 36 for the requested information. The broadcast server 22 packages the requested database information and transmits it over the space segment 24. The mobile base station 26 receives the database information transmitted over the space segment 24 and disseminates the information over the local area network 32 to the mobile user(s) 30.

Figure 3A:
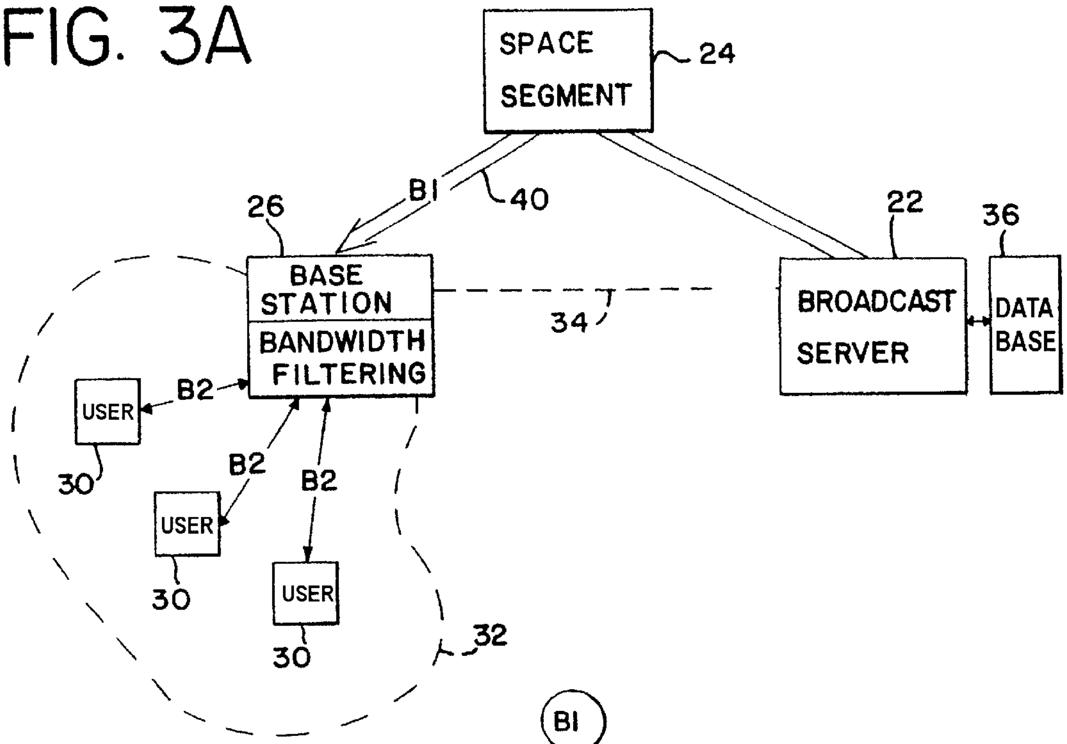
FIGS. 3*a*–3*b* show diagrams of the bandwidth-based filtering of the mobile base station of FIG. 1.

Referring to FIG. 2, the mobile base station 26 preferably includes a software proxy process 39 to control the dissemination of information to the mobile users 30. For example, a baseband-based filtering scheme as shown in FIG. 3*a* matches the space segment 24 bandwidth to the local area network 32. The space segment 24 information signal 40 preferably has a transmission bandwidth (B1) of about 12 Mbps whereas the local area network 32 typically has a lower transmission bandwidth (B2) of only 2 Mbps. Bandwidth-based filtering compensates for the bandwidth mismatch between the 12 Mbps data rate of the space segment 24 and the 2 Mbps data rate of the local area network 32. Baseband-based filtering reduces the 12 Mbps space segment 24 to the 2 Mbps local area network 32 by reducing data in the 12 Mbps bitstream.

Figure 3B:
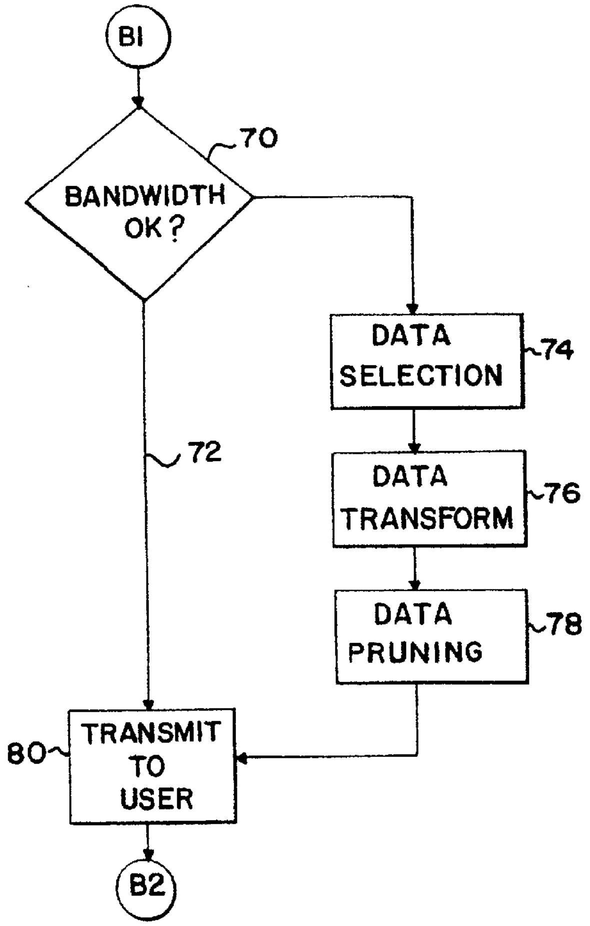

As shown in FIG. 3*b*, the bandwidth-based filter first determines 70 whether the available local area network 32 bandwidth (B1) (FIG. 2) to the mobile users 30 is sufficient to transmit the desired information rate. If the available bandwidth is sufficient, the information can be transmitted without bandwidth filtering 72. If the available bandwidth is insufficient to transmit the desired information, the bandwidth-based filtering operation is performed. Bandwidth-based filtering may include the steps of data selection 74, data transformation 76, and data pruning 78 depending on the particular data. For example, when filtering a MPEG compressed video data stream the step of data selection 74 may involve choosing which video frames of the compressed video stream will be transmitted to the mobile user. Typically only the I-frames of the compressed video data stream are selected to be transmitted in the reduced bandwidth data stream. Data transformation 76 converts the I-frames into another data stream format according to the available bandwidth. Data pruning 78 may also be implemented using techniques to further reduce the bandwidth of the data stream. The data stream is then transmitted 80 to the mobile user.

Figure 4:
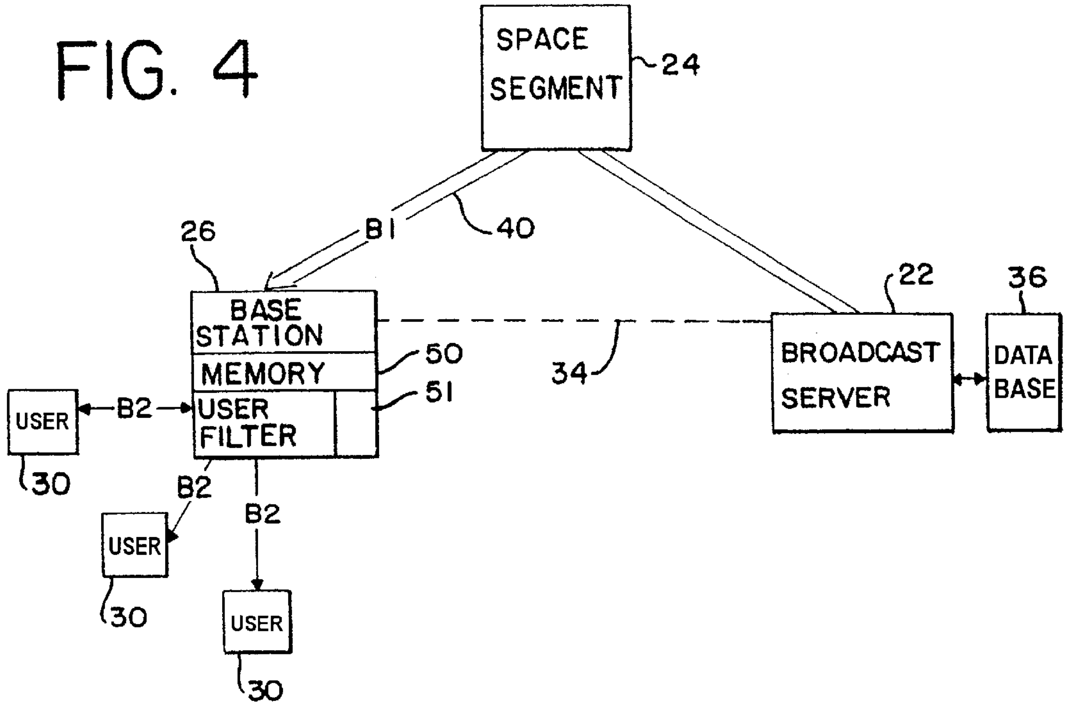
FIG. 4 shows a diagram of the user-based filtering of the mobile base station of FIG. 1.

As shown in FIG. 4, an user-based filtering scheme allows the local area network 32 to effectively serve a larger number of mobile users 30 over the available space segment 24. User-based filtering optimizes the usage of the space segment 24 bandwidth when a number of mobile users 30 are processing different views of the same or related database information. For example, mobile users 30 may be accessing a database of financial information. Several users may be accessing similar information, such as the price history of particular Dow Jones Industrial Index stock and the current stock prices of the Dow Jones Industrial Index. With user-based filtering, the broadcast server 22 transmits a single copy of the Dow Jones prices to be stored in the memory 50 of the mobile base station 26. The mobile base station 26 disseminates the particular information requested by the mobile users 30 from the stored information 50.

User-based filtering, optimizes the utilization of the available space segment 24 (FIG. 1) information signal 40 bandwidth (B1) (FIG. 2). Because the mobile base station 26 (FIG. 1) memory 50 contains a copy of the database information, the space segment 24 only carries changes necessary to update the mobile base station 26 memory 50 copy of the information. The mobile base station 26 has a record 51 of the information of interest for each particular mobile user 30. The mobile base station 26 compares the record 51 for each mobile user 30 against the database information in memory 50 and disseminates information to mobile users 30 when relevant changes occur to the memory 50. The mobile base station 26 thus maintains communication with mobile users 30 independently of the space segment 24. The number of mobile users 30 which access the same database information 36 is thus independent of the available bandwidth of the space segment 24.

Figure 5:
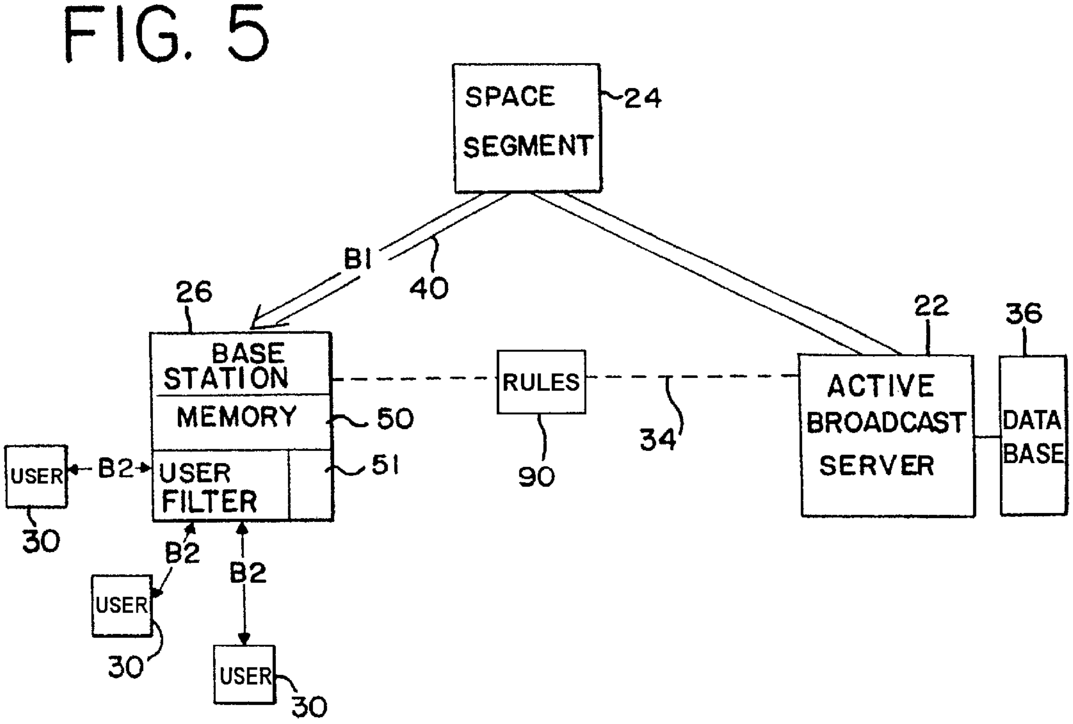
FIG. 5 shows a diagram of the active broadcast protocol of the mobile base of FIG. 1.

As seen in FIG. 5, an active broadcast protocol minimizes the latency inherent in maintaining updated information across a distributed information system. The active broadcast protocol automatically updates information distributed to the mobile base station and mobile users when changes to the information database occur. Active broadcast updates occur according to a rule or set of rules 90 determined by the mobile users 30 and the mobile base station 26. Each mobile user or mobile base station 26 registers a rule set 90 which are transmitted to the broadcast server 22. The rule set 90 defines the relevant changes in the information database 36 which trigger automatic updates to the mobile base station 26 and mobile users 30. Each mobile user 30 or mobile base station 26 defines a set of rules 90 which defines its information of interest. The rule set 90 can be transmitted to the broadcast server 22 via the communication uplink 34. The broadcast server 22 applies the rule set 90 of the mobile users 30 and mobile base station 26 against the information database 36 to immediately identify when relevant changes occur to the information database 36.

For example, a relevant change to a financial information database may comprise a change in stock prices. When a stock price change occurs to a stock of interest as defined by the rule set 90 the updated stock price is automatically distributed to the mobile base station 32 by the broadcast server.

Alternatively, the active broadcast rule may be defined by a service provider according to when and how often it wishes to provide updated information to mobile users. In such a case, the rule is not changeable by the mobile users.

Active broadcast automatically transmits updated information as relevant changes to the information occur. The active broadcast of updated information automatically pushes updated information out to the mobile users, thus minimizing the latency in providing updated information across the distributed network. In addition, active broadcast reduces the overall network load by reducing user polling requests for updated information and minimizing the transmission of redundant data.

The present invention allows the high-speed, real-time dissemination of multimedia information over interconnected heterogeneous communication systems. The interconnection of different communication systems and the use of wireless technology allows a flexible communication architecture. The flexible architecture enables the rapid deployment of a communication infrastructure in a variety of different locations.

Of course, it should be understood that a wide range of changes and modifications can be made to the preferred embodiment described above. A communication system, for example, may include a plurality of mobile base stations implementing a number of local area networks. It is therefore intended that the foregoing detailed description be regarded as illustrative rather than limiting and that it be understood that it is the following claims, including all equivalents, which are intended to define the scope of this invention.

We claim:

1. A system for disseminating data from an information database to a plurality of mobile users, comprising:

a broadcast server connected to the information database, the broadcast server adapted to request and receive the data from the information database and to transmit the data to a mobile base station, the mobile base station having a processor and a computer readable memory;

a receiver connected to the mobile base station and adapted to receive the data transmitted by the broadcast server;

a network interface attached to the mobile base station and adapted to transmit the data to the plurality of mobile users and to receive information requests from the plurality of mobile users;

a communication link attached to the mobile base station and adapted to communicate the information requests to the broadcast server;

the computer readable memory being adapted to store a copy of the data transmitted by the broadcast server and to store the information requests received from the plurality of mobile users; and first software routine stored in the computer readable memory and adapted to operate on the processor to determine data updates representing at least some of the data transmitted by the broadcast server which updates the stored copy of the data and to transmit at least some of the data updates to the plurality of mobile users based on the information requests received from the plurality of mobile users.

2. A system of claim 1, wherein the network interface comprises a wireless network interface.

3. A system of claim 1, wherein the first software routine is further adapted to transmit data updates to the mobile users based on a rule set provided by the plurality of mobile users.

4. A system of claim 1, wherein the first software routine is further adapted to transmit data updates to the mobile users based on a rule set provided by the broadcast server.

5. A system of claim 1, wherein the receiver comprises a satellite receiver.

6. A system of claim 1, further comprising a second software routine stored on the computer readable memory and adapted to operate on the processor to reduce bandwidth of the data received from the broadcast server to a bandwidth at which the data is transmitted to the plurality of mobile users.

7. A system of claim 1, wherein the communication link comprises one of a land-line telephone connection and a cellular telephone connection.

8. A system of claim 1, wherein the receiver decompresses, decodes and de-multiplexes the data transmitted by the broadcast server.

9. A system of claim 1, wherein the network interface is connected to the plurality of mobile users via a wireless local area network.

10. A system of claim 9, wherein the plurality of mobile users are connected to the wireless local area network via network interface cards.

11. A mobile base station for disseminating data to a plurality of mobile users, comprising:

a receiver adapted to receive data transmitted by a broadcast server;

a network interface adapted to transmit data to the plurality of mobile users and to receive information requests from the plurality of mobile users;

a communication link adapted to communicate the information requests to the broadcast server;

a computer readable memory adapted to store a copy of the data transmitted by the broadcast server and to store the information requests received from the plurality of mobile users; and first software routine stored in the computer readable memory and adapted to operate on a processor to determine data updates representing at least some of the data transmitted by the broadcast server which updates the stored copy of the data and to transmit at least some of the data updates to the plurality of mobile users based on the information requests received from the plurality of mobile users.

12. A mobile base station of claim 11, wherein the network interface comprises a wireless network interface.

13. A mobile base station of claim 11, wherein the first software routine is further adapted to transmit data updates to the mobile users based on a rule set provided by the plurality of mobile users.

14. A mobile base station of claim 11, wherein the first software routine is further adapted to transmit data updates to the mobile users based on a rule set provided by the broadcast server.

15. A mobile base station of claim 11, wherein the receiver comprises a satellite receiver.

16. A mobile base station of claim 11, further comprising a second software routine stored on the computer readable memory and adapted to operate on the processor to reduce bandwidth of the data received from the broadcast server to a bandwidth at which the data is transmitted to the plurality of mobile users.

17. A mobile base station of claim 11, wherein the communication link comprises one of a land-line telephone connection and a cellular telephone connection.

18. A mobile base station of claim 11, wherein the receiver decompresses, decodes and de-multiplexes the data transmitted by the broadcast server.

19. A mobile base station of claim 11, wherein the network interface is connected to the plurality of mobile users via a wireless local area network.

20. A mobile base station of claim 19, wherein the plurality of mobile users are connected to the wireless local area network via network interface cards.

21. A method of disseminating data from an information database to a plurality of mobile users, the method comprising:

receiving information requests from the plurality of mobile users at a mobile base station;

storing the information requests on a computer readable memory at the mobile base station;

transmitting the information requests to a broadcast server attached to the information database;

requesting and receiving data from the information database at the broadcast server;

transmitting the data received at the broadcast server to the mobile base station;

storing a copy of the data in the computer readable memory;

determining data updates representing at least some of the data transmitted by the broadcast server which updates the stored copy of the data; and transmitting at least some of the data updates to the plurality of mobile users based on the information requests received from the plurality of mobile users.

22. A method of claim 21, wherein the mobile base station communicates with the plurality of mobile users via a wireless network interface.

23. A method of claim 21, further comprising receiving and storing a mobile user data update rule set from the plurality of mobile users specifying frequency of transmitting of data updates to the plurality of mobile users.

24. A method of claim 23, further comprising transmitting data updates to the plurality of mobile users according to the mobile user data update rule set.

25. A method of claim 21, further comprising receiving and storing a broadcast server data update rule set from the broadcast server specifying frequency of transmitting of data updates to the plurality of mobile users.

26. A method of claim 25, further comprising transmitting data updates to the plurality of mobile users according to the broadcast server data update rule set.

27. A method of claim 21, wherein the broadcast server transmits data to the mobile base station via a satellite communication link.

28. A method of claim 21, wherein the mobile base station communicates the information requests to the broadcast server using one of a land-line telephone connection and a cellular telephone connection.

29. A method of claim 21, further comprising reducing the bandwidth of the data received from the broadcast server to a bandwidth at which the data is transmitted to the plurality of mobile users.

30. A method of claim 21, further comprising decompressing, decoding and de-multiplexing the data transmitted by the broadcast server at the mobile base station.

31. A method of claim 21, wherein the plurality of mobile base stations communicate with the mobile base station using network interface cards.

* * * * *